United States Patent Office.

JULES EMILE BOIVIN AND DÉSIRÉ LOISEAU, OF PARIS, FRANCE, ASSIGNOR TO CHARLES FREDERICH CHANDLER, OF NEW YORK.

Letters Patent No. 99,141, dated January 25, 1870.

IMPROVED PROCESS FOR EXTRACTING, MANUFACTURING, AND REFINING SUGAR.

The Schedule referred to in these Letters Patent and making part of the same.

To all whom it may concern:

Be it known that we, JULES EMILE BOIVIN and DÉSIRÉ LOISEAU, of Paris, France, have invented a new and improved Process for Extracting, Manufacturing, and Refining Sugar; and we do hereby declare that the following is a full, clear, and exact description thereof, which will enable others skilled in the art to make and use the same.

Our invention relates to the application and preparation of a new compound for extracting or manufacturing sugar from cane-juice, beet-juice, sirup, molasses, or other saccharine solution, and for refining or purifying raw cane, beet, or other sugar, or substance containing sugar, or of sirup, molasses, or other saccharine solution.

The invention consists, first, in the new composition employed, and secondly, in the novel method of applying the same.

The compound is made of sugar, lime, and carbonic acid, and is, therefore, more properly termed saccharo-carbonate of lime. It is produced by allowing carbonic acid to act on a moderately-strong solution of lime in sugar. It is not necessary that all the lime should be in actual solution; a portion of it may be mechanically suspended.

In case undissolved lime is present, the saccharo-carbonate of lime is formed less rapidly under the influence of carbonic acid, because it is probably dissolved with the formation of a saccharo-hydrate of lime.

Solutions may thus be obtained, containing three equivalents of lime to one equivalent of sugar, which cannot be accomplished without the aid of carbonic acid. If the suspended lime is filtered out at this moment, the clear filtrate will be found to contain both the saccharo-hydrate of lime, with three equivalents of lime, and our new compound, the saccharo-carbonate of lime. Heated to 212° Fahrenheit, this solution becomes turbid, but clears again on cooling.

The same result attends the treatment of a clear solution of lime in sugar with carbonic acid.

On continuing to pass carbonic acid into these calcareous sugar-solutions, which are liable to coagulate by heat, the new compound, which we call saccharo-carbonate of lime, and which we claim as our new invention, will be obtained.

We conceive this compound to have the chemical composition, $C_{12}H_8O_8, 2(CaO, Ho, CaO, Co,)Ho$, equivalent to, sugar 44; lime, 38.1; carbonic acid, 17.9; equal to 100.

We do not limit ourselves to the specific proportions set forth, as our invention consists broadly in the use of a substance formed by the action of carbonic acid upon the saccharine solution of lime, in the manner described, whatever may be its exact chemical composition.

To obtain this product practically, we vary the process, to suit the subsequent use we intend to make of it.

For purifying saccharine products, such as raw sugar, &c., we prepare a solution of lime in sugar, using whatever variety of sugar may be at hand.

Into this solution, which must not be too hot, we inject a stream of carbonic-acid gas. At first a slight froth appears on the surface of the solution, and at the same time the chemical reaction raises the temperature. Soon the froth diminishes in quantity and the liquid thickens. When the maximum effect is produced—a point which we have learned to recognize by experience—the current of carbonic acid is interrupted.

The operation is now complete, and the saccharo-carbonate is ready for use.

For purifying raw sugar, a suitable quantity of the saccharo-carbonate of lime is added to the solution of the raw sugar in water, the proportion to be added depending upon the amount of the impurities in the raw sugar. Heat is then applied, when the saccharo-carbonate is decomposed, the sugar being set free, while the hydro-carbonate of lime is precipitated in combination with the impurities.

After a few minutes boiling in the open air, or in a partial vacuum, the liquid is filtered, and a stream of carbonic acid is passed through the clear solution, to precipitate the lime that may still remain dissolved.

The precipitated carbonate of lime is removed by filtering, and the solution is then ready for further treatment in the usual way.

For extracting sugar from saccharine solutions, molasses, beet-juice, cane-juice, &c., we proceed as follows:

If we desire to operate upon a solution containing fifty per cent. of crystallizable sugar, we use, say, two thousand pounds of the solution, and a weight of lime equal to the crystallizable sugar present, one thousand pounds.

The lime is, slaked with water to a thick paste, and added to the sugar-solution. A current of carbonic acid is then passed into the mixture, which is at the same time stirred by an agitator.

The treatment with gas is continued as long as the liquid continues to thicken from the formation of the saccharo-carbonate of lime. The current of gas is then interrupted, and twenty-two hundred gallons of tepid lime-water are gradually added. The quantity of lime-water employed varies with the impurity of the original sugar solution.

The insoluble saccharo-carbonate is then separated from the mother-liquid by any convenient process of filtering, or by the centrifugal machine, and is decomposed by carbonic acid, in the presence of water, which separates the lime, and leaves the sugar-solution ready for further treatment.

Instead of decomposing the saccharo-carbonate by carbonic acid, we sometimes use it for purifying raw sugars, sirups, &c.

The successive use of lime and carbonic acid, which is now very general, and which gives such good results on beet-juice and other solutions that contain but little uncrystallizable sugar, and which are quite dilute, has never given satisfactory results when applied to cane-juice or to solutions of raw sugar containing uncrystallizable sugar.

Our saccharo-carbonate of lime, however, gives entire satisfaction. It purifies diluted or concentrated solutions with equal facility, beet-juice or thick sirups, and entirely obviates the necessity of using blood or fine bone-black, as heretofore. All the products are unexceptionably beautiful, and are free from that peculiar germ of decomposition which is introduced by the use of blood. There is, also, a great diminution of the percentage of molasses produced.

We are aware that sugar and lime have already been used in succession, but never yet in combination with carbonic acid, the addition of which produces the advantages hereinbefore set forth.

Having thus described our invention,

We claim as new, and desire to secure by Letters Patent—

1. The saccharo-carbonate of lime, produced substantially as herein specified.

2. The application of the saccharo-carbonate of lime, herein specified, to the extracting, manufacturing, and refining of sugar, as set forth.

E. BOIVIN.
D. LOISEAU.

Witnesses:
   F. OLCOTT,
   LAVIALLE.